United States Patent
Deen

(10) Patent No.: US 9,140,119 B2
(45) Date of Patent: Sep. 22, 2015

(54) WELLBORE SERVICING FLUIDS AND METHODS OF MAKING AND USING SAME

(71) Applicant: Halliburton Energy Services, Inc., Houston, TX (US)

(72) Inventor: Larry R. Deen, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 267 days.

(21) Appl. No.: 13/709,790

(22) Filed: Dec. 10, 2012

(65) Prior Publication Data
US 2014/0158363 A1    Jun. 12, 2014

(51) Int. Cl.
| | |
|---|---|
| E21B 33/12 | (2006.01) |
| E21B 43/01 | (2006.01) |
| E21B 49/08 | (2006.01) |
| C09K 8/06 | (2006.01) |
| C09K 8/14 | (2006.01) |

(52) U.S. Cl.
CPC .............. *E21B 49/087* (2013.01); *C09K 8/06* (2013.01); *C09K 8/14* (2013.01); *E21B 33/12* (2013.01)

(58) Field of Classification Search
CPC ............ C09K 8/06; C09K 8/14; E21B 33/12; E21B 33/13; E21B 43/01; E21B 43/12
USPC ............ 166/336, 350, 358, 367, 250.01, 302, 166/292, 901; 507/926
See application file for complete search history.

(56) References Cited

U.S. PATENT DOCUMENTS

| | | | |
|---|---|---|---|
| 4,528,104 A * | 7/1985 | House et al. ................... | 507/233 |
| 4,609,476 A * | 9/1986 | Heilweil ........................ | 507/121 |
| 4,846,280 A * | 7/1989 | Snider ........................... | 166/372 |
| 6,908,886 B2 * | 6/2005 | Jones et al. .................... | 507/112 |
| 6,918,440 B2 | 7/2005 | Garcia-Soule et al. | |
| 7,219,735 B2 * | 5/2007 | Smith et al. ................ | 166/305.1 |
| 7,306,039 B2 * | 12/2007 | Wang et al. ................... | 166/300 |
| 7,316,275 B2 * | 1/2008 | Wang et al. ................... | 166/300 |
| 7,328,744 B2 | 2/2008 | Taylor et al. | |

(Continued)

FOREIGN PATENT DOCUMENTS

WO        2007133477 A1    11/2007

OTHER PUBLICATIONS

Halliburton Product Data Sheet entitled Brinedril-Vis™, Viscosifier, Baroid, Aug. 31, 2010, 1 page, Halliburton.

(Continued)

*Primary Examiner* — Matthew Buck
(74) *Attorney, Agent, or Firm* — Haynes and Boone, LLP

(57) ABSTRACT

A method of servicing a wellbore within a subterranean formation comprising providing a drill string disposed within the wellbore having one or more tubulars associated therewith and forming one or more annuli around the drill string; placing an insulating packer fluid comprising an aqueous base fluid and a viscosifying agent into at least one of the one or more annuli surrounding the drill string; and performing a drill stem test while the insulating packer fluid is in place. A method of servicing a wellbore within a subterranean formation comprising placing an insulating packer fluid in an annular space between a tubular and a marine riser extending from a surface vessel or platform and a subsea wellhead, wherein the insulating packer fluid comprising an aqueous base fluid and a viscosifying agent and has a thermal conductivity of from about 0.008 BTU/(hr·ft·F) to about 0.245 BTU/(hr·ft·F).

19 Claims, 8 Drawing Sheets

(56) References Cited

U.S. PATENT DOCUMENTS

| | | | |
|---|---|---|---|
| 7,713,917 B2 * | 5/2010 | Wang et al. | 507/261 |
| 7,762,332 B2 * | 7/2010 | Lopez et al. | 166/302 |
| 7,896,078 B2 * | 3/2011 | Wang et al. | 166/302 |
| 7,923,419 B2 * | 4/2011 | Qu et al. | 507/261 |
| 7,966,876 B2 * | 6/2011 | Irani et al. | 73/152.23 |
| 8,030,389 B2 * | 10/2011 | Tej et al. | 524/445 |
| 8,109,335 B2 | 2/2012 | Luo et al. | |
| 8,119,575 B2 | 2/2012 | Taylor et al. | |
| 8,230,925 B2 | 7/2012 | Willberg et al. | |
| 2003/0032561 A1 * | 2/2003 | Kippie et al. | 507/200 |
| 2004/0011990 A1 * | 1/2004 | Dunaway et al. | 252/62 |
| 2004/0059054 A1 * | 3/2004 | Lopez et al. | 525/54.3 |
| 2005/0038199 A1 * | 2/2005 | Wang et al. | 525/329.4 |
| 2005/0113264 A1 * | 5/2005 | Vollmer | 507/211 |
| 2011/0227254 A1 | 9/2011 | Reck-Glenn et al. | |
| 2012/0157355 A1 | 6/2012 | Collins et al. | |
| 2012/0231977 A1 * | 9/2012 | McKennis et al. | 507/103 |

OTHER PUBLICATIONS

Halliburton Product Data Sheet entitled Bromi-Vis®, Viscosifier, Baroid, Mar. 25, 2010, 1 page, Halliburton.

Halliburton Product Data Sheet entitled Geltone® II, Viscosifier, Baroid, Mar. 26, 2010, 1 page, Halliburton.

Halliburton brochure entitled N-Solate® High Performance Insulating Packer Fluids, Baroid, Apr. 2012, 2 pages, Halliburton.

Foreign communication from a related counterpart application—International Search Report and Written Opinion, PCT/US2013/068553, Jan. 31, 2014, 14 pages.

* cited by examiner

WELLBORE SERVICING FLUIDS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field

This disclosure relates to methods of servicing a wellbore. More specifically, it relates to compositions and methods for drill stem testing.

2. Background

Natural resources such as gas, oil, and water residing in a subterranean formation or zone are usually recovered by drilling a wellbore down to a subterranean formation while circulating a drilling fluid via a drill string within the wellbore. A drill stem test (DST) is commonly employed to determine the productive capacity, pressure, permeability, and/or extent of a hydrocarbon reservoir. DSTs are usually conducted utilizing a downhole shut-in tool that allows the well to be opened and closed at the bottom of the hole, for example, via a valve which may be actuated at the surface. Typically, during a DST, the zone of interest is isolated and reservoir fluids are allowed to flow through the drill string (e.g., pipe) for a time period. Samples of fluids produced from the DSTs are collected and analyzed to determine a variety of parameter which may be related to production such as the extent of resources (e.g., oil or gas) present in the formation. A DST may also be used to measure the flow rate of the fluids from the formation, the temperature and/or pressure associated with the formation, or combinations thereof. One challenge to conducting a DST in low temperature environments (e.g., offshore, permafrost, arctic drilling), is the potential for the formation of gas hydrates inside the drill string. Gas hydrates, in addition to potentially interfering with equipment operation (e.g., by plugging up a flow conduit) may pose a hazard to the operator. Thus there is an ongoing need for improved compositions and methodologies for use in DST.

SUMMARY

Disclosed herein is a method of servicing a wellbore within a subterranean formation comprising providing a drill string disposed within the wellbore having one or more tubulars associated therewith and forming one or more annuli around the drill string; placing an insulating packer fluid comprising an aqueous base fluid and a viscosifying agent into at least one of the one or more annuli surrounding the drill string; and performing a drill stem test while the insulating packer fluid is in place.

Also disclosed herein is a method of servicing a wellbore within a subterranean formation comprising placing an insulating packer fluid in an annular space between a tubular and a marine riser extending from a surface vessel or platform and a subsea wellhead, wherein the insulating packer fluid comprising an aqueous base fluid and a viscosifying agent and has a thermal conductivity of from about 0.008 BTU/(hr·ft·F) to about 0.245 BTU/(hr·ft·F).

Also disclosed herein is a method of servicing a wellbore within a subterranean formation comprising placing an insulating packer fluid in an annular space between a tubular and (i) a wellbore wall, (ii) a casing string, or (iii) both, wherein the wellbore penetrates permafrost and wherein the insulating packer fluid is circulated in the annular space while a drill stem test is performed.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
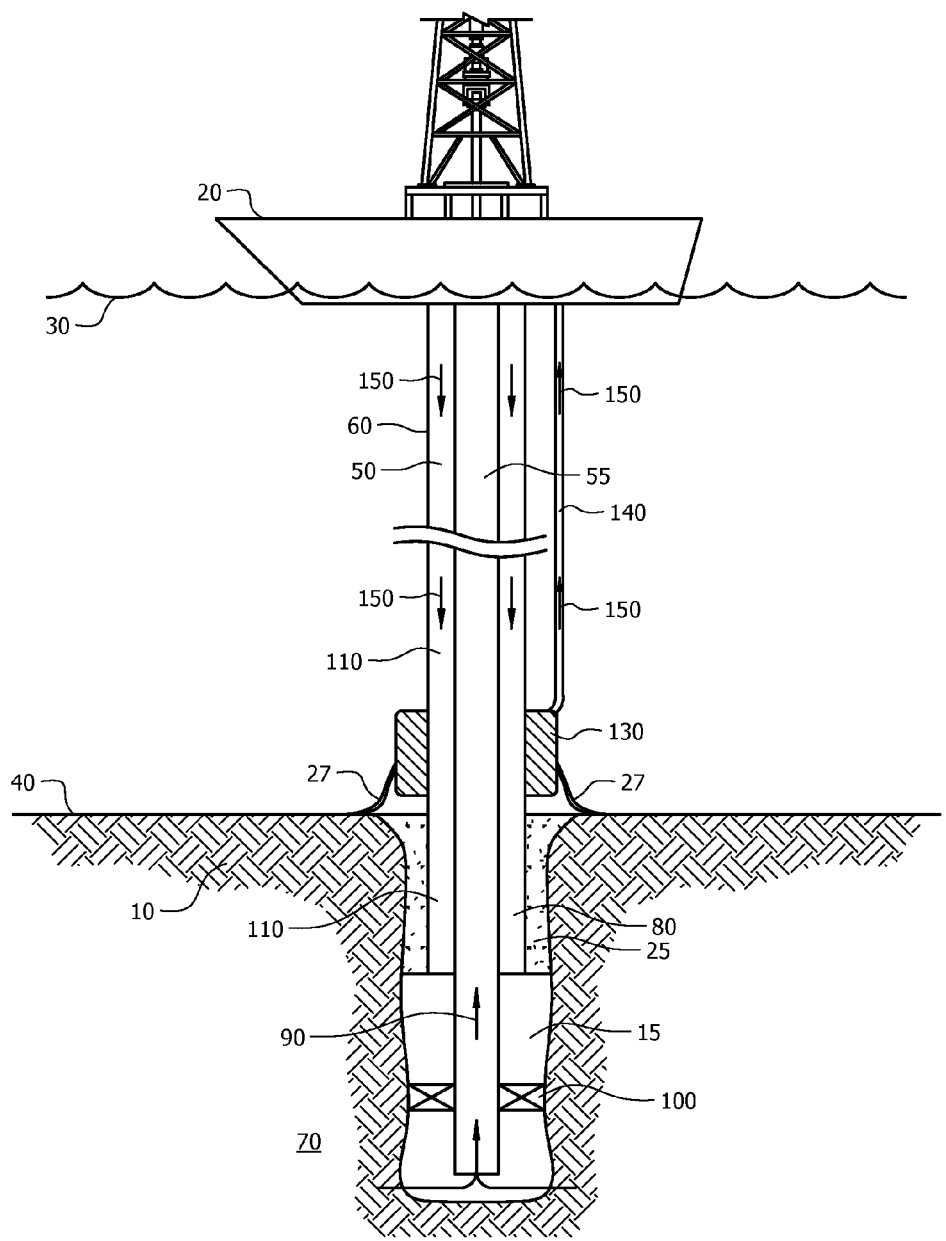
FIG. 1 is a schematic view of an embodiment of an environment in which a drill stem testing and/or completion method may be employed.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

In the drawings and description that follow, like parts are typically marked throughout the specification and drawings with the same reference numerals, respectively. In addition, similar reference numerals may refer to similar components in different embodiments disclosed herein. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is not intended to limit the invention to the embodiments illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "up-hole," "upstream," or other like terms shall be construed as generally from the formation toward the surface or toward the surface of a body of water; likewise, use of "down," "lower," "downward," "down-hole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis.

Unless otherwise specified, use of the term "subterranean formation" shall be construed as encompassing both areas below exposed earth and areas below earth covered by water such as ocean or fresh water.

Disclosed herein are embodiments of wellbore servicing methods, as well as fluids, apparatuses and systems that may be utilized in performing same. Particularly, disclosed herein are embodiments of a drill stem test (DST). A DST of the type disclosed herein utilizes one or more fluids (e.g., insulating fluids) which, in some embodiments, may be recovered and/or reused in the same or subsequent wellbore operations.

Referring to FIG. 1, an embodiment of an operating environment in which a wellbore servicing apparatus and/or system (for example, of the type disclosed herein) may be employed is illustrated. It is noted that although some of the figures may exemplify horizontal or vertical wellbores, the principles of the methods, apparatuses, and systems disclosed herein may be similarly applicable to horizontal wellbore configurations, conventional vertical wellbore configurations, and combinations thereof. Therefore, the horizontal and/or vertical nature of a portion of a wellbore illustrated within a given figure is not to be construed as limiting the wellbore to any particular configuration.

Referring to the embodiment of FIG. 1, the operating environment generally comprises a wellbore 15 that penetrates a subterranean formation 10 for the purpose of recovering hydrocarbons. The wellbore may be drilled into the subterranean formation 10 using any suitable drilling technique. For example, in an embodiment, a drilling or servicing rig may be located on an offshore floating platform 20 or drillship which may be partially submerged beneath the sea level 30. The wellbore is drilled into the formation 10 beneath a sea bed 40. In such an embodiment, the drilling or servicing rig comprises a derrick with a rig floor through which various work strings (e.g., a drill string, a tool string, a segmented tubing string, a jointed tubing string, or any other suitable conveyance, or combinations thereof) generally defining an axial flowbore may be positioned within or partially within the wellbore. In an embodiment, such a string may comprise two or more concentrically positioned strings of pipe or tubing (e.g., a first work string may be positioned within a second work string). The drilling or servicing rig may be conventional and may comprise a motor driven winch and other associated equipment for lowering the work string into the wellbore. Alternatively, any suitable type and/or configuration of drilling and/or servicing rig may be similarly employed. In such an embodiment, one or more of the various work strings may be utilized in drilling, stimulating, completing, or otherwise servicing the wellbore, or combinations thereof. In an embodiment, the work string comprises a drill string 50.

The wellbore 15 may extend substantially vertically away from the sea bed 40 over a vertical wellbore portion, or may deviate at any angle from the sea bed 40 over a deviated or horizontal wellbore portion. In alternative operating environments, portions or substantially all of the wellbore 15 may be vertical, deviated, horizontal, and/or curved. In an embodiment, portions or substantially all of the wellbore 15 may be cased, uncased, or combinations thereof. In an embodiment, where all or a portion of the wellbore 15 is cased with a casing string 80, portions or substantially all of the casing string may be secured into position within the wellbore 15 in a conventional manner using cement 25; alternatively, the casing string 80 may be secured within the wellbore 15 utilizing a packer (e.g., permanent/retrievable mechanical or swellable packer), such as SWELLPACKERS, commercially available from Halliburton Energy Services located in Houston, Tex.).

Figure 2:
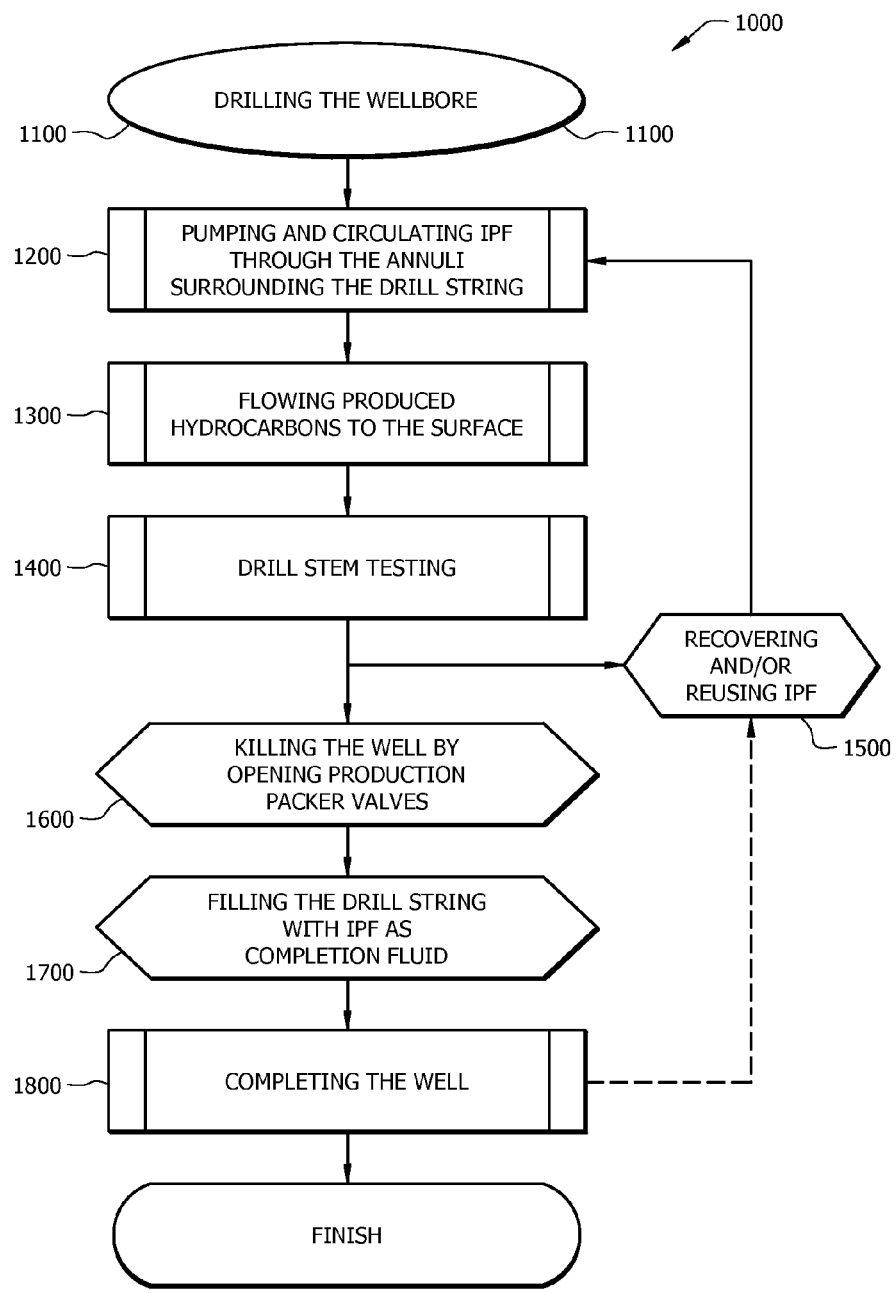
FIG. 2 is a schematic representation of a drill stem testing and/or completion method.

Referring to FIG. 2, an embodiment of a DST method 1000 is depicted. In the embodiment of FIG. 2, the DST method 1000 generally comprises the steps of drilling the wellbore 1100; pumping and circulating insulating packer fluid (IPF) through an annuli surrounding the drill string 1200; flowing produced hydrocarbons to the surface 1300; testing the produced hydrocarbons and associated wellbore features 1400; directing at least a portion of the IPF to be recovered and/or reused 1500; killing the well by opening production packer valves 1600; filling the drill string with completion fluid 1700; completing the well 1800; and optionally directing at least a portion of the IPF to be recovered and/or reused 1500, or combinations thereof.

In various embodiments, a DST of the type disclosed herein may be employed, by way of non-limiting examples, in newly drilled wellbores (e.g., upon temporary cessation of drilling upon reaching an interval at a desired depth or upon permanent cessation of drilling upon reaching a final depth), previously drilled wellbores that have not been previously completed or subjected to production, previously drilled wellbores that have not been previously completed but have been previously subjected to production, wellbores that have been previously completed but have not been previously subjected to production, re-completed or worked-over wells (e.g., re-fractured), or combinations thereof.

Referring again to the embodiment of FIG. 1, the wellbore 15 may be drilled into the subterranean formation 10 as previously described herein. In an embodiment, the drill string 50, which generally defines an axial flowbore 55, may extend generally downward from the sea level 30 toward the sea bed 40 through and/or within a marine riser 60, thereby generally defining an annular space 110 between the drill string 50 and the marine riser 60. In an embodiment, the lower-most portion of the marine riser 60 may extend to, terminate at, and/or be secured to a subsea wellhead assembly, which may include a subsea tree having various components such as a blow-out preventer (BOP) or BOP stack 130. The BOP 130 may comprise any suitable configuration of valves, annular preventers, blind rams, shear rams, or combinations thereof. The BOP 130 may be located above and substantially at the sea bed 40, for example, the BOP 130 may be positioned substantially near (e.g., above, for example, directly above, the wellhead, wellbore casing, subsea tree, or the like).

In an embodiment, the drill string 50 may extend through the BOP 130 and into the formation 10. In an embodiment, the drill string 50 may extend substantially to the end (e.g., the "toe") of the wellbore 15, for example, substantially to the full depth of the wellbore 15. For example, in the embodiment of FIG. 1 where at least a portion of the wellbore 15 is cased with a casing string 80, the annular space 110 may extend into the formation 10 and may be generally defined by the drill string 50 and the casing string 80; additionally or alternatively, in an embodiment where all or a portion of the wellbore 15 is uncased, the annular space 110 may be similarly defined by the drill string 50 and the wellbore 15 (e.g., one or more wellbore walls).

While the embodiment of FIG. 1, illustrates an embodiment in which a singular annular space encases the drill string 50 (i.e., annulus 110), it will apparent to one of skill in the art that various configurations of tubular strings may be provided concentrically surrounding the drill string 50, thereby providing additional, concentrically outward annular spaces. For example, in an additional embodiment, the marine riser 60 may be further encased with in an outer tubular string, for example, a second marine riser. In such an embodiment, the marine riser 60 and the second riser may generally define a second annular space.

As will be appreciated by one of skill in the art upon viewing this disclosure, during a drilling operation, a drilling fluid may be circulated (e.g., forward circulated) into the formation 10 (e.g., into the wellbore 15) via the axial flowbore 55 of the drill string 50 and returned to the platform 20 via the annular space 110. As will also be appreciated by one of skill in the art upon viewing this disclosure, the circulation of such a drilling fluid during the drilling operation may be effective to assist in the removal of cuttings from the wellbore 15 (e.g., drill cuttings) to suspend cuttings, to control formation pressure, to cool and/or lubricate drilling equipment (e.g., bits), to maintain wellbore (e.g., open hole) stability, or combinations thereof.

Additionally, in the embodiment of FIG. 1, a packer 100 may be incorporated and/or integrated within the drill string 50 and positioned within the wellbore 15 beneath the sea bed 40 level, as will be disclosed herein. In an alternative embodiment, upon completion of drilling, a production tubing and related production packer may be placed into a wellbore and testing performed (likewise, referred to as a DST herein), for example in accordance with the layout shown in FIG. 1 and the process described in step 1100 of FIG. 2.

Upon cessation of a drilling operation, the circulation of a drilling fluid or mud within the annular space 110 may likewise be halted, leaving a substantial portion of the drill string exposed to ambient conditions, which may lead to the undesirable formation of gas hydrates as discussed therein. Thus, in various embodiments according to the present disclosure, upon the permanent, alternatively, temporary, cessation of drilling operations, for example, when it is desirable to allow a formation fluid to be communicated from the formation to the surface (e.g., for the performance of a DST), as will be disclosed herein, at least a portion of the drill string 50 may be isolated (e.g., partially or substantially thermally isolated) from the surrounding environment (e.g., from the body of water through which the drill string extends) through the use of an insulating packer fluid (IPF) of the type described herein.

Referring to the embodiment of FIG. 1, an IPF may be introduced into the annular space 110 surrounding the drill string 50 (e.g., the annular space between the drill string 50 and the marine riser 60). For example, in an embodiment, the IPF may be circulated, for example, at a suitable flow rate through the annular space 110. In an embodiment, the IPF may be circulated through the annular space 110 via the operation of one or more pumps, for example, which may be located on the platform 20 of a proximate support vessel.

In an embodiment, the IPF may be circulated into the annular space 110 via any suitable combination of flow paths. For example, in the embodiment of FIG. 1, the IPF may be circulated downward through the annular space 110 and returned to the platform 20 via a secondary flowline 140 (such as a well control line or a boost line), as demonstrated by flow arrows 150. Alternatively, the IPF may be circulated downward through the secondary flowline 140 and upward through the annular space 110. In such an embodiment, the secondary flowline 140 may be contained within the annular space (e.g., the secondary flowline 140 may be positioned within the marine riser 60). Additionally or alternatively, the annular space 110 may be separated into at least two flowpaths, thereby allowing fluids to be circulated therethrough in both directions.

In an embodiment, the IPF may be circulated to a suitable depth within the annular space 110. For example, in the embodiment of FIG. 1, the path of circulation of the IPF (e.g., as demonstrated by flow arrow 150) extends substantially to sea bed 40, which may be accomplished via a diverter valve 27 located in the subsea wellhead assembly or component thereof (e.g., BOP 130). Alternatively, the path of circulation may extend into the subterranean formation dependent upon the particular flow path(s) provided for the IPF, for example a flow path substantially similar to the flow path of drilling fluid circulated during drilling operations. In various embodiments, the IPF may be pumped into the desired annular space (e.g., the annular space in a marine riser extending from about the subsea wellhead to about the surface platform) and held static (e.g., pumping/circulation ceased), held dynamic (e.g., continual pumping/circulation a high, low, or varied flow rates), and/or held in combinations of static and dynamic (e.g., intermittent pumping/circulation at high, low, or varied flow rates).

In an embodiment, the IPF may be circulated (e.g., pumped) into the annular space 50 at a temperature of from about 30° F. to about 140° F., alternatively from about 70° F. to about 90° F., alternatively from about 30° F. to about 70° F., or alternatively from about 60° F. to about 14° F. In an embodiment, the IPF may serve to insulate the drill string 50 and the annuli 110, for example, so as to minimize heat transfer (e.g., heat loss) between the drill string, the annular space 110, and or the surrounding sea water, as disclosed herein. In an embodiment, all or a portion of the IPF returned to the platform 20, designated a used IPF, may be recycled to form a recycled IPF which can subsequently be reutilized; alternatively, the used IPF may be stored for later use or alternatively the used IPF may be discarded. In an embodiment, the recycled IPF may be subjected to a temperature modification process (i.e., heated or reheated) with the purpose of providing the user and/or process desired temperature of IPF before being recirculated into the annular space 110.

In an embodiment, the IPF comprises an aqueous-based fluid, a viscosifying agent, hydrocarbons, polyalcohols, inorganic additives, or combinations thereof.

In an embodiment, the IPF comprises an aqueous base fluid. Herein, an aqueous base fluid refers to a fluid having equal to or less than about 20 vol. %, 15 vol. %, 10 vol. %, 5 vol. %, 2 vol. %, or 1 vol. % of a non-aqueous fluid based on the total volume of the IPF. Aqueous base fluids that may be used in the IPF include any aqueous fluid suitable for use in subterranean applications. For example, the IPF may comprise water or brine. In an embodiment, the aqueous base fluid comprises a brine. In such an embodiment, the brine generally comprises water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, produced water, or combinations thereof. The salt or salts in the water may be present in an amount sufficient to provide a density ranging from about 8.5 lb/gal to about 19.2 lb/gal, alternatively from about 8.5 lb/gal to about 12.3 lb/gal, or alternatively from about 8.5 lb/gal to about 14.2 lb/gal. In an embodiment, the salt or salts in the water may be present within the aqueous base fluid in an amount sufficient to yield saturated brines.

Nonlimiting examples of aqueous brines suitable for use in the present disclosure include chloride-based, bromide-based, phosphate-based or formate-based brines containing monovalent and/or polyvalent cations, salts of alkali and alkaline earth metals, or combinations thereof. Additional examples of suitable brines include, but are not limited to: NaCl, KCl, NaBr, $CaCl_2$, $CaBr_2$, $ZnBr_2$, ammonium chloride ($NH_4Cl$), potassium phosphate, sodium formate, potassium formate, cesium formate, ethyl formate, methyl formate, methyl chloro formate, triethyl orthoformate, trimethyl orthoformate, or combinations thereof.

The choice of brine may be dictated by a variety of factors such as the formation condition and the desired density of the resulting solution. The brine may be present in an amount of from about 2.0 wt. % to about 63 wt. %, based on the total weight of the IPF. Alternatively, the aqueous base fluid may comprise the balance of the IPF after considering the amount of the other components used.

In an embodiment, the IPF comprises a viscosifying agent. Nonlimiting examples of viscosifying agents suitable for use in the present disclosure include without limitation inorganic materials, synthetic hectorite, organophilic clays (e.g., amine-treated clays), water-soluble polymers, biopolymers, synthetic polymers, polyamide resins, polycarboxylic acids, soaps, viscoelastic surfactants, or combinations thereof. The viscosifying agent may be present within the IPF in a range of from about alternatively from about 0.1 lb/bbl to about 25.0 lb/bbl, alternatively from about 0.1 lb/bbl to about 8 lb/bbl, or alternatively from about 4 lb/bbl to 9 lb/bbl.

In an embodiment, the viscosifying agent comprises a biopolymer. Nonlimiting examples of biopolymers suitable for use in this disclosure include polysaccharides, lignosulfonates; chitins; chitosans; proteins; proteinous materials; fatty alcohols; fatty esters; fatty acid salts; derivatives thereof, or combinations thereof. More examples of biopolymers suitable for use in the present disclosure are described in U.S. Pat. Nos. 8,109,335; 8,230,925; and U.S. Patent Application Publication No. 20110227254 A1, each of which is incorporated herein in its entirety.

In an embodiment, the biopolymer comprises polysaccharides, such as starches, cellulose, dextran, substituted or unsubstituted galactomannans, guar gums, high-molecular weight polysaccharides composed of mannose and galactose sugars, heteropolysaccharides obtained by the fermentation of starch-derived sugar (e.g., xanthan gum), diutan, scleroglucan, derivatives thereof, or combinations thereof.

In an embodiment, the biopolymer comprises guar or a guar derivative. Nonlimiting examples of guar derivatives suitable for use in the present disclosure include hydroxypropyl guar, carboxymethylhydroxypropyl guar, carboxymethyl guar, hydrophobically modified guars, guar-containing compounds, synthetic polymers, or combinations thereof.

In an embodiment, the biopolymer comprises cellulose or a cellulose derivative. Nonlimiting examples of cellulose derivatives suitable for use in the present disclosure include cellulose ethers, carboxycelluloses, carboxyalkylhydroxyethyl celluloses, hydroxyethylcellulose, hydroxypropylcellulose, carboxymethylhydroxyethylcellulose, carboxymethylcellulose, or combinations thereof.

In an embodiment, the biopolymer comprises a starch. Nonlimiting examples of starches suitable for use in the present disclosure include native starches, reclaimed starches, waxy starches, modified starches, pre-gelatinized starches, or combinations thereof.

In an embodiment, the viscosifying agent comprises GEL-TONE II viscosifier, and/or TEMPERUS viscosifier. GEL-TONE II viscosifier is an organophilic clay and TEMPERUS viscosifier is a modified fatty acid, both of which are commercially available from Halliburton Energy Services, Inc.

In an embodiment, the viscosifying agent comprises a modified celluslose such as hydroxyethylcellulose (HEC). In such embodiments, the IPF may contain additional materials that facilitate the use of the modified cellulose (e.g., HEC). For example the IPF may contain an effective amount of a divalent cation (e.g., $Zn^2$) that facilitates the use of the HEC as a viscosifying agent.

In an embodiment, the IPF comprises a hydrate inhibitor such as an alcohol or polyalcohol. For example, the IPF may comprise 1,2 alcohols, 1,3 alcohols, or combinations thereof. Without limitation, an example of a suitable 1,2 alcohol is polysaccharide (e.g., guar gum), and an example of a suitable 1,3 alcohol is a polyvinyl alcohol. In an embodiment, the hydrate inhibitor comprises, butanol and alcohols of C5 or higher, mono-, di- and triethylene glycol, mono-, di- and tripropylene glycol, dibutylene glycol, glycol ethers such as ethylene glycol monobutyl ether and diethylene glycol methyl ether, low cloud point glycols, glycol amines, polyglycerin, polyglycol, and mixtures thereof. In an embodiment, the hydrate inhibitor comprises sugars, sugar alcohols, or combinations thereof. Specific suitable sugars and sugar alcohols include, but are not necessarily limited to, glucose, fructose, galactose, mannose, maltose, sucrose, sorbitol, mannitol, xylitol, and mixtures thereof.

In an embodiment, the IPF comprises one or more additives to improve the properties of the fluid. Additives which may be included in the IPF include without limitation fluid loss additives, corrosion inhibitors, shale stabilizers, oxygen scavengers, biocides, defoamers, and the like. Additives to improve the properties of the IPF may be included singularly or in combination and in amounts effective to meet one or more user and/or process needs.

In an embodiment, the IPF comprises N-SOLATE insulating packer fluids which are high-performance insulating packer fluids commercially available from Halliburton Energy Services, Inc. The density of the N-SOLATE insulating packer fluids may range from about 8.5 lb/gal to about 15.0 lb/gal. If the IPF requires a density higher than 15.0 lb/gal, then the density of the IPF may be adjusted by adding any suitable additives to the N-SOLATE insulating packer fluids, in order to increase their density to the required value. In an embodiment, a weighting agent (e.g., synthetic hectorite and barite) may be added to the N-SOLATE insulating packer fluids in amounts effective to produce some user and/or process desired density.

The components of the IPF may be combined in any order desired by the user to form a fluid that may then be placed into a wellbore. The components of the IPF may be combined using any mixing device compatible with the composition, for example a bulk mixer or a recirculating mixer.

In an embodiment, the IPF may be used at temperatures ranging from about 100° F. to about 600° F. In an embodiment, the IPF has a low thermal conductivity (i.e., low ability to transfer/exchange heat). Two mechanisms of heat transfer in liquids occur conduction and convection. In the case of conductive heat transfer, the heat is being transferred from one stationary molecule to another, between the heat source and the heat sink. In the case of convective heat transfer, the molecules travel from the heat source to the heat sink, transferring heat. Referring to FIG. 1, when the produced hydrocarbons are present in drill string 50 and the temperature outside the drill string 50 is lower than the temperature of the produced hydrocarbons inside the drill string 50, heat may be transferred from the produced hydrocarbons to the environment outside the drill string 50 (e.g., sea water, etc.). Referring to the embodiment of FIG. 1, when as the produced hydrocarbons flow to the surface (as demonstrated by flow arrow 90) they experience a decreasing temperature gradient that ranges from the bottom hole temperature (BHT) of the formation in which they are produced to that of the portion of the drill string 50 located above the sea bed 40. For example, the produced hydrocarbons may experience a BHT ranging from about 70° F. to about 550° F., or alternatively from about 150° F. to about 265° F.

In an embodiment, heat transfer between the produced hydrocarbons flowing to the surface and the environment outside the drill string 50 (e.g., casing annuli, sea water, etc) is minimized by surrounding the drill string with a fluid of low thermal conductivity (i.e., an IPF of the type disclosed herein).

In an embodiment, the IPF has a thermal conductivity of from about 0.008 BTU/(hr·ft·F) to about 0.245 BTU/(hr·ft·F), alternatively from about 0.008 BTU/(hr·ft·F) to about 0.016 BTU/(hr·ft·F), alternatively about 0.017 BTU/(hr·ft·F) to about 0.225 BTU/(hr·ft·F), or alternatively about 0.22 BTU/(hr·ft·F) to about 0.245 BTU/(hr·ft·F). The thermal conductivity of the IPF may be determined empirically using any suitable methodology.

In an embodiment, the IPF can mitigate the formation of gas hydrates in the fluid being produced. i.e., it has the ability to prevent or reduce gas hydrate formation, by insulating the drill string and/or other wellbore components. Gas hydrates are ice-like minerals and for deep water environments are crystals that form under low temperature (e.g., mud line temperature) and high pressure (e.g., reservoir pressure) conditions. Gas hydrates contain gas molecules that are enclosed in cages of water molecules and may be encountered in wellbores located in deep water (e.g., deep sea or ocean wells), permafrost, arctic wellbores or any environment consisting of free water, sufficient pressure and sufficient reduction in temperature. In an embodiment, a DST performed with an IPF of the type disclosed herein has a reduction in gas hydrate formation of greater than about 30%, alternatively greater than about 50%, or alternatively about 100% when compared to a DST performed in the absence of an IPF of the type disclosed herein.

In an embodiment, the wellbore is a surface well located in a permafrost or arctic area, where the environmental conditions (e.g., temperature, pressure) may lead to the formation of gas hydrates. In such embodiment, the presence of the IPF of the type described herein surrounding the drill string (e.g., in an annular space between the drill string and the surrounding casing/wellbore) may either partially or completely prevent the formation of gas hydrates.

In an embodiment, the IPF is a solids-free fluid comprising less than about 10 wt. %, 9 wt. %, 8 wt. %, 7 wt. %, 6 wt. %, 5 wt. %, 4 wt. %, 3 wt. %, 2 wt. % or 1 wt. % solids based on the total weight of the IPF.

In an embodiment, the IPF has a density of from about 8.5 lb/gal to about 10.2 lb/gal, alternatively about 8.5 lb/gal to about 14.3 lb/gal, or alternatively about 8.5 lb/gal to about 19.2 lb/gal. The density of the IPF may be determined by empirically using any suitable methodology. In an embodiment, the IPF has a viscosity of from about 26 centipoise (cP) to greater than about 2,000 cP. The viscosity of the IPF may be determined using various rheometer models.

Upon placement of the IPF fluid at step 1200 of FIG. 2, the method proceeds to flowing produced hydrocarbons to the surface 1300. In an embodiment and with reference to FIG. 1, upon finalizing the drilling process, the packer valve 100 may be closed. When the packer valve 100 is closed, the produced hydrocarbons may flow up to the surface through the drill string 50, as shown in FIG. 1 (e.g., flow arrow 90). The drill string 50 may be equipped at the top with an adjustable choke valve that controls the flow rate (e.g., ¼ choke, ½ choke, ¾ choke, full choke, etc.) of the produced hydrocarbons stream, demonstrated by flow arrow 90. The actuation of the packer 100 may be effective to prevent the produced hydrocarbons from entering the annular space 110 surrounding the drill string 50.

In an embodiment, the hydrostatic pressure in the drill string 50 is reduced lower than the subterranean formation 10 pressure, which enables the produced hydrocarbons to flow up the drill string and to the surface where the adjustable choke valve regulates the flow rate of the produced hydrocarbons, demonstrated by flow arrow 90. In an embodiment, the difference between the drill string 50 hydrostatic pressure and the subterranean formation 10 pressure is about 2000 psi, alternatively sufficient difference in hydrostatic pressure to initiate an influx of reservoir fluid into the wellbore at sufficient rate and pressure.

Referring to the embodiment of FIG. 2, flowing produced hydrocarbons to the surface step 1300 may enable the drill stem testing step 1400. While the drill stem testing 1400 occurs, monitoring and/or controlling (e.g., holding/pumping/circulating/reheating/supplementing/replacing, etc. the IPF according to an operating plan or profile) of an IPF of the type disclosed herein in the annuli surrounding the drill string step 1200 may occur as well. For example, periodic or continuous circulating of the IPF through annuli 1200 may provide insulation against heat loss from the drill string to the surrounding casings, annuli, and/or sea water and may prevent the formation of gas hydrates while a DST is being performed.

In an embodiment, the DST 1400 comprises wellbore pressure behavior testing, obtaining fluid samples from the subterranean formation, further assessing geological or other physical properties (e.g., permeability, porosity, fluid resistivity, temperature, pressure, bubble point, etc.) of the subterranean formation and/or fluids contained therein, hydrocarbon production rates (liquid and gas), water cut, gas analysis, hydrocarbon analysis, and skin damage. DST procedures are described in more detail in U.S. Pat. Nos. 7,966,876 and 6,918,440, each of which is incorporated by reference herein in its entirety.

In an embodiment, the IPF may be recovered and/or reused as show by step 1500 in FIG. 2. The IPF may be recirculated, reconditioned (e.g., reheated, compositionally modified, etc.), and/or reused as through a system of pumps and valves as previously described herein, while the DST is ongoing. In an embodiment, recovering and/or reusing the IPF may be a continuous process, an intermittent process, or combinations thereof.

In an embodiment, the IPF may be recirculated and reused during the DST for a period of time of about 2 weeks, alternatively about 1 week, alternatively about 5 days, alternatively about 4 days, alternatively about 3 days, alternatively about 2 days, or alternatively about 1 day.

Referring to FIG. 2, upon completion of the DST, the well may be killed by opening the packer valve 1600. Referring to the embodiment of FIG. 1, the IPF from the annular space 110 may exit the marine riser 60 and enter the lower (e.g., below the subsea wellhead) portion of the annular space/wellbore by opening a diverter valve 27 in the subsea wellhead assembly, the packer valve 100, or combinations thereof, thereby providing an overbalanced pressure which prevents hydrocarbons from being produced by the formation.

Upon completion of drilling, the well may be completed or otherwise prepared for final production of hydrocarbons, and one or more IPFs of the type described herein may be used in such completions operations. In an embodiment and with reference to step 1700 of FIG. 2 and the operating environment of FIG. 1, a production tubing and production packer may be placed into the wellbore, and one or more IPFs may be placed within the various annular spaces to provide thermal insulating functions and/or to provide/assist with wellbore control (e.g., an IPF having a sufficient density to provide an overbalanced operating environment). Accordingly, the well may be completed and production brought online, as referenced at step 1800 of FIG. 2, in accordance with industry accepted practices. In an embodiment, the well may be completed by performing any suitable wellbore servicing operation such as filtercake removal, cementing, perforating, fracturing, etc. Completion operations are described in more detail in U.S. Patent Application Publication No. 20120157355 A1, which is incorporated by reference herein in its entirety.

In an embodiment, the IPF may be recirculated and reused during the completion operations for a period of time of about 2 weeks, alternatively about 1 week, alternatively about 5 days, alternatively about 4 days, alternatively about 3 days, alternatively about 2 days, or alternatively about 1 day.

In an embodiment, the methods and compositions disclosed herein may advantageously prevent the formation of gas hydrates in the drill string during DST operations and/or during subsequent completion operations. Further advantages that may be realized by the compositions and methodologies disclosed herein include the ability to employ the IPF as both an insulator for the drill string during DST and/or as an insulator and/or well control fluid during completion operations. In such embodiments, the transition between the DST and the completion operation may be facilitated due to the ability to use as a completion fluid the IPF already present in the wellbore in the annuli surrounding the drill string.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Figure 3:
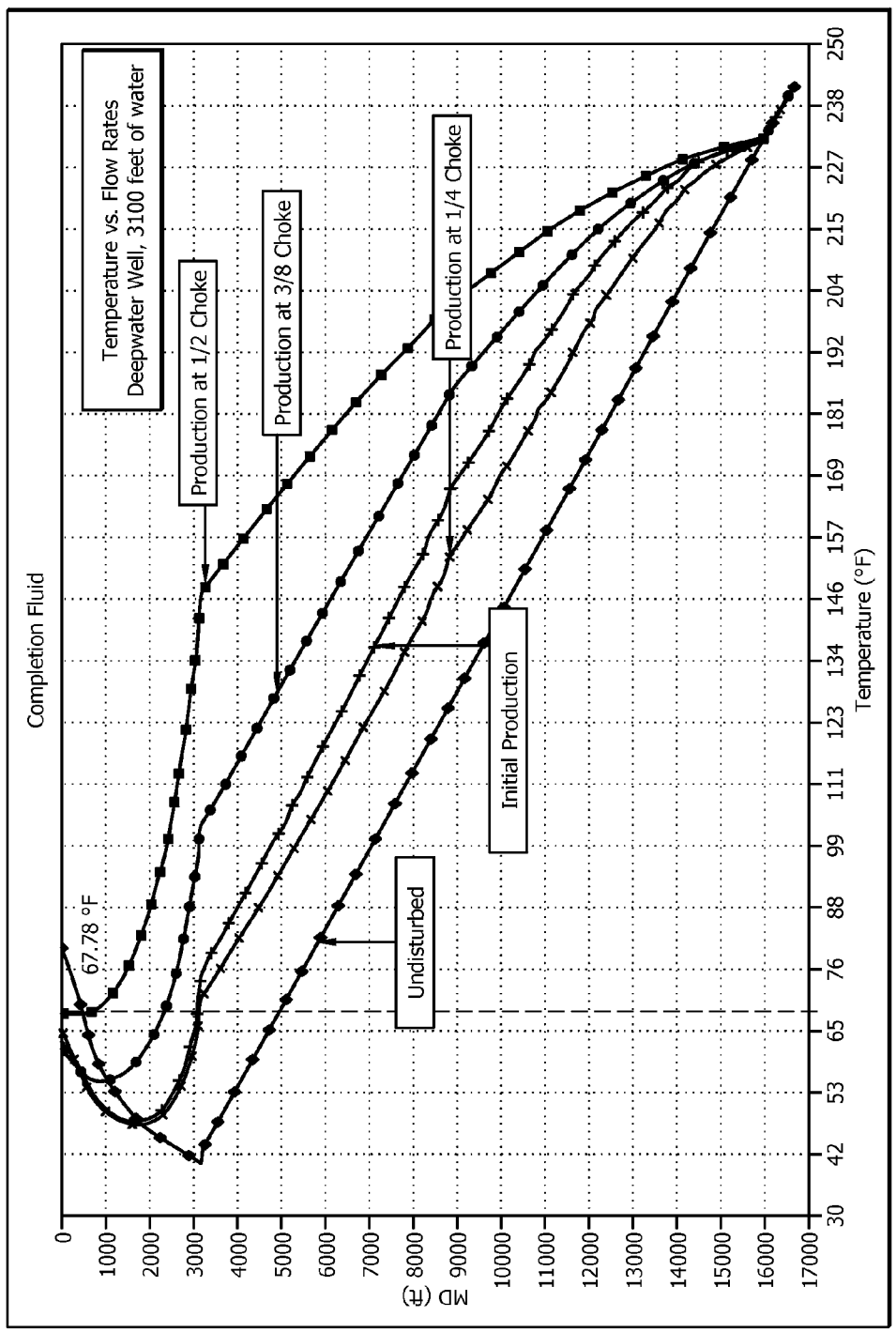
FIG. 3 is a schematic representation of conductive and convective heat transfer.
Figure 4:
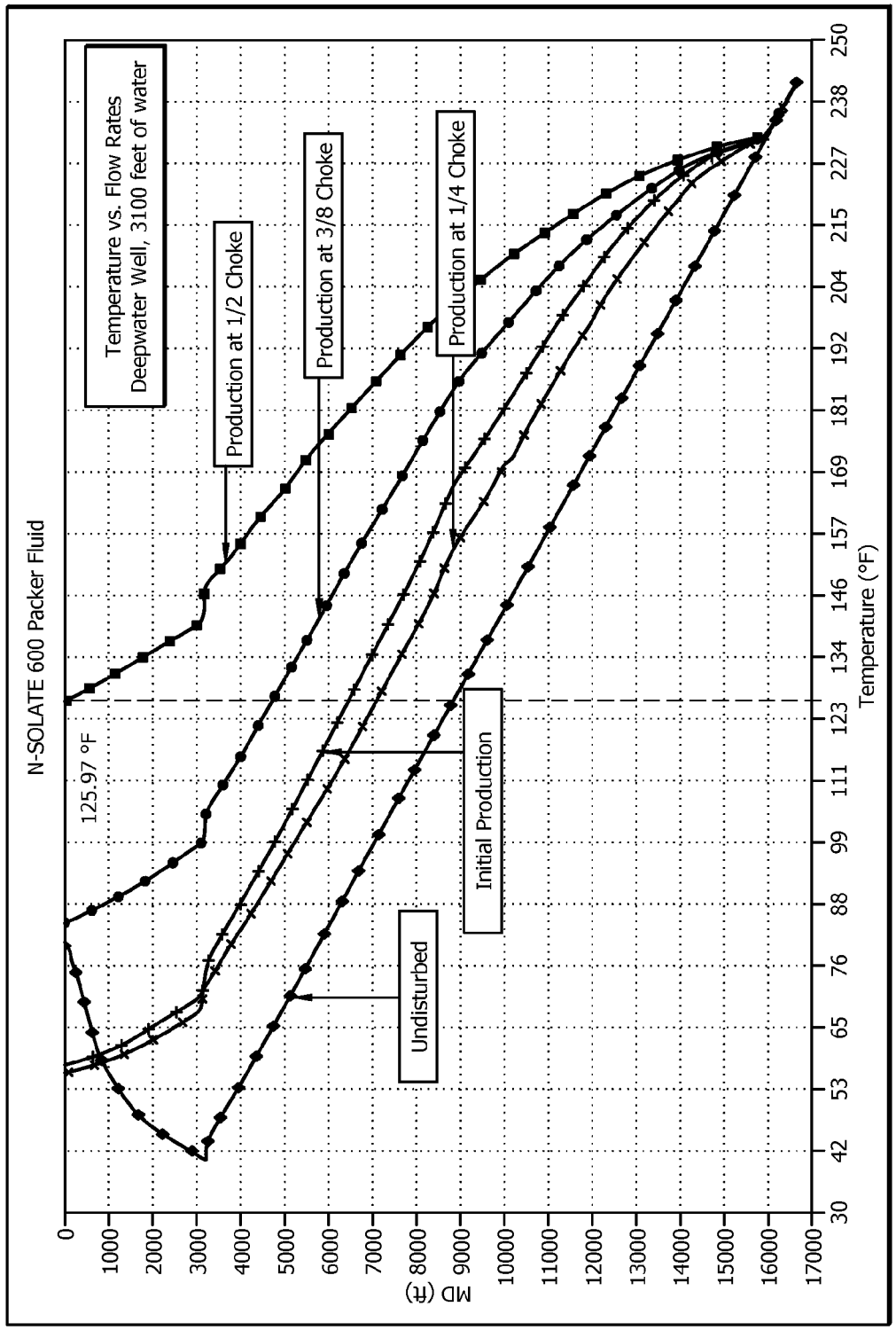
FIGS. 4 and 5 are plots of fluid temperatures versus drilling depth at different flow rates for the samples from Example 1.
Figure 5:
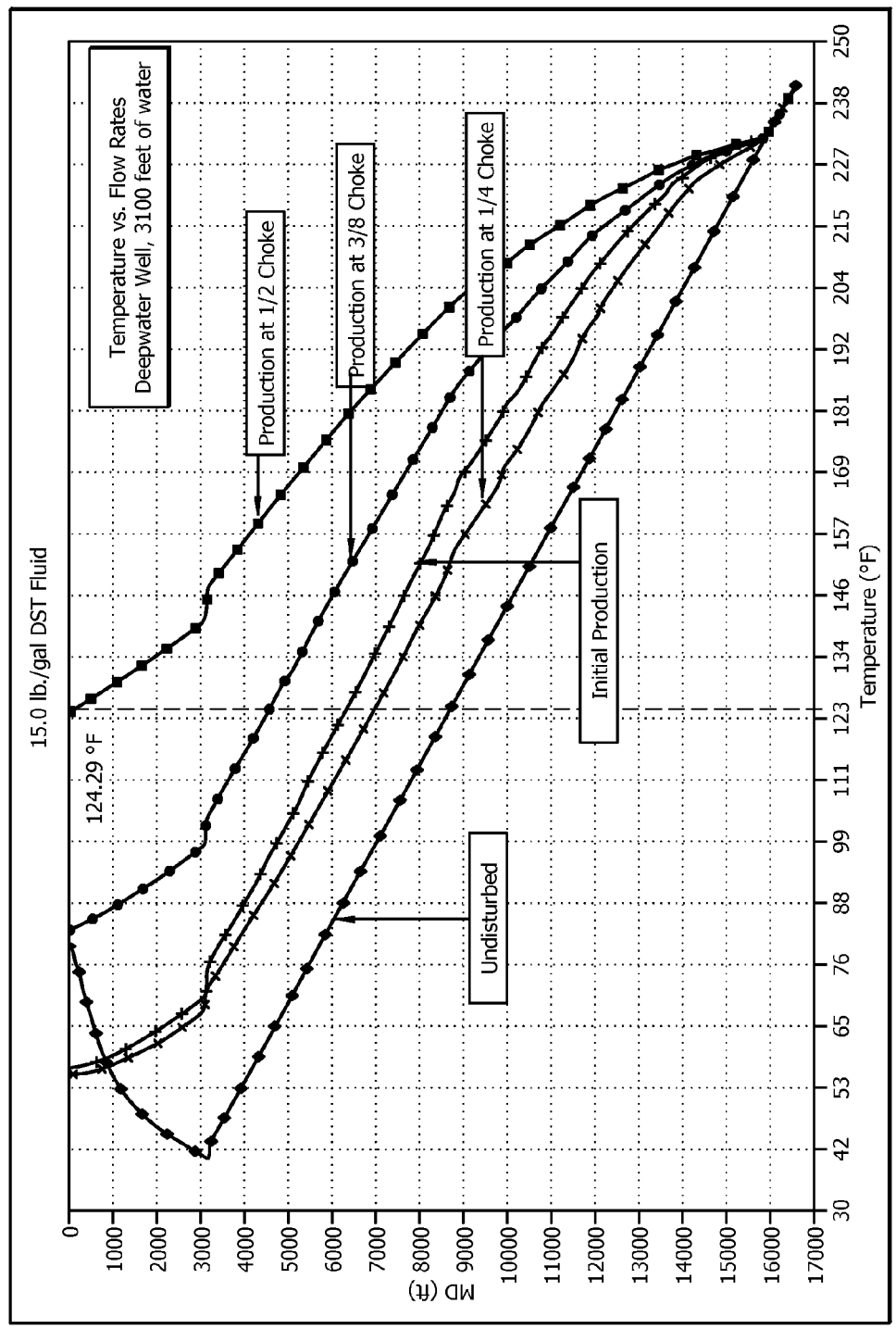

The temperature profiles for the produced hydrocarbons in a drill string as a function of measured depth (MD) were modeled for different flow rates, and the results are displayed in FIGS. 3, 4 and 5. Modeling and production simulations were carried out using Landmark's Well Cat Software to provide the well bore structural design parameters, including casing types and depths, cement type and depths in the wellbore. The modeling also accounts for other trapped fluids and their respective properties within annuli including WBM and SBM. The software also accounts for the type and analysis of produced fluids expected to be obtained from the producing formation. In all the mathematical modeling pertaining to this example, the wellbore was a deep-water well, with the sea bed located 3,100 feet under the sea level; the subterranean formation was located at ~17,000 feet under the sea level; the bottom hole temperature (BHT) was 245° F.

In FIGS. 3, 4 and 5, the solid diamonds correspond to the undisturbed temperature profiles (i.e., the hydrocarbons are not flowing through the drill string, but are rather static in the drill string), the "x" correspond to ¼ choke flow rate, the "±"correspond to initial production, the solid circles correspond to ⅜ choke flow rate, and the solid squares correspond to ½ choke flow rate. The undisturbed temperature profile is identical in FIGS. 3, 4 and 5, and the same parameters were used for modeling and obtaining this data.

The modeling results in FIG. 3 are for an uninsulated drill string, while the results in FIGS. 4 and 5 are for drill strings insulated with N-SOLATE 600 insulating packer fluid and an IPF of the type disclosed herein, respectively. The IPF used for insulating the drill string in FIG. 5 was a viscosified $CaBr_2$ brine with the following composition presented in Table 1:

TABLE 1

| Density | Component | Amount |
|---|---|---|
| 8.345 | Water | 0.2099 (gal) |
| 15.00 | 15.0 lb/gal base brine, bbl | 0.4574 |
| 19.20 | 19.2 lb/gal $CaBr_2/ZnBr_2$, bbl | 0.3326 |
| | Final Density, lb/gal | 15.0 |
| | BRINEDRIL-VIS, lb | 2.0 |
| | BROMI-VIS, lb (active) | 1.0 |

As it can be seen from FIG. 3, for the undisturbed temperature profile the temperature at sea bed level is about 39° F. For the initial and the ¼ choke flow rates, the temperature at about 2,000 ft below sea level is about 44° F. At the solid square flow rate, the produced hydrocarbons maintain a temperature of about 68° F., once they reach the sea level. With the addition of an insulating packer fluid around the drill string, at the solid square flow rate, the produced hydrocarbons maintain a temperature of about 126° F. for N-SOLATE 600 insulating packer fluid (FIG. 4) and about 124° F. for the IPF CaBr viscosified brine (FIG. 5), once they reach the sea level. For the ½ choke the temperature of the produced hydrocarbons at the top of tubing is about 124° F. This is a significant improvement to maintain the flowing temperature of the produced hydrocarbons as compared to a riser fluid that does not provide insulation. This insulation can significantly mitigate the formation of hydrates by lessening the amount of fluid heat that escapes through the riser.

Example 2

The thermal properties of an IPF of the type disclosed herein were investigated. The base brine, designated Sample 1,was a 15 lb/gal $CaBr_2$ brine prepared using 0.8418 bbl of a 14.2 lb/gal $CaBr_2$ brine and 0.1388 bbl of a 19.2 lb/gal $CaBr_2/ZnBr_2$ brine. Water and an additional amount of the 19.2 lb/gal $Ca/ZnBr_2$ fluid was added to the base brine to produce a 15 lb/gal brine that contained 7% zinc and is designated Sample 2. The formulation of the Sample 2 is presented in Table 2.

TABLE 2

| Density (lb/gal) | Component | Amount (bbl) |
| --- | --- | --- |
| 8.345 | Water | 0.2099 |
| 15.00 | Base CaBr$_2$ brine | 0.4574 |
| 19.20 | Ca/ZnBr$_2$ | 0.3326 |

Sample 2 was viscosified by the addition of 2 ppb BRINEDRIL-VIS viscosifier and 1 ppb BROMI-VIS viscosifier to produce an IPF, designated Sample 3. BRINEDRIL-VIS viscosifier is a water-soluble polymer and BROMI-VIS viscosifer is a liquid organic product both of which are commercially available from Halliburton Energy Services. The thermal conductivity of the formulation was determined to be 0.234 BTU/(hr·ft·F). This value is the average of 4 readings taken in the temperature range from 66.2° F. to 66.7° F. over a 60 minute time interval while the specific heat capacity in the absence of BRINEDRIL-VIS viscosifier and BROMI-VIS viscosifer was determined to be 0.4347 BTU/(hr·F). Sample 3 was conditioned by rolling for 2 hours at 150° F. Subsequently the rheological properties of Sample 3 were measured at the indicated temperatures using a FANN 35 viscometer at 3, 6, 100, 200, 300, and 600 RPM. Specifically, the viscosity at each mixing speed, plastic viscosity (PV) (centipoise) and yield point (YP) (lbs/100 ft$^2$) of Sample 3 was measured in accordance with API Recommended Practices 10B, Bingham Plastic Model and are given in Table 3. The PV is an absolute flow property indicating the flow resistance of certain types of fluids and is a measure of shearing stress while the YP refers to the resistance of the drilling fluid to initial flow, or represents the stress required to start fluid movement.

TABLE 3

| Test Temperature (° F.) | 75 | 100 | 150 |
| --- | --- | --- | --- |
| 600 rpm | 147 | 122 | 89 |
| 300 rpm | 104 | 88 | 64 |
| 200 rpm | 85 | 72 | 52 |
| 100 rpm | 62 | 52 | 36 |
| 6 rpm | 16 | 137 | 7 |
| 3 rpm | 11 | 9 | 4 |
| Plastic Viscosity | 43 | 34 | 25 |
| Yield Point | 61 | 54 | 39 |

Figure 6:
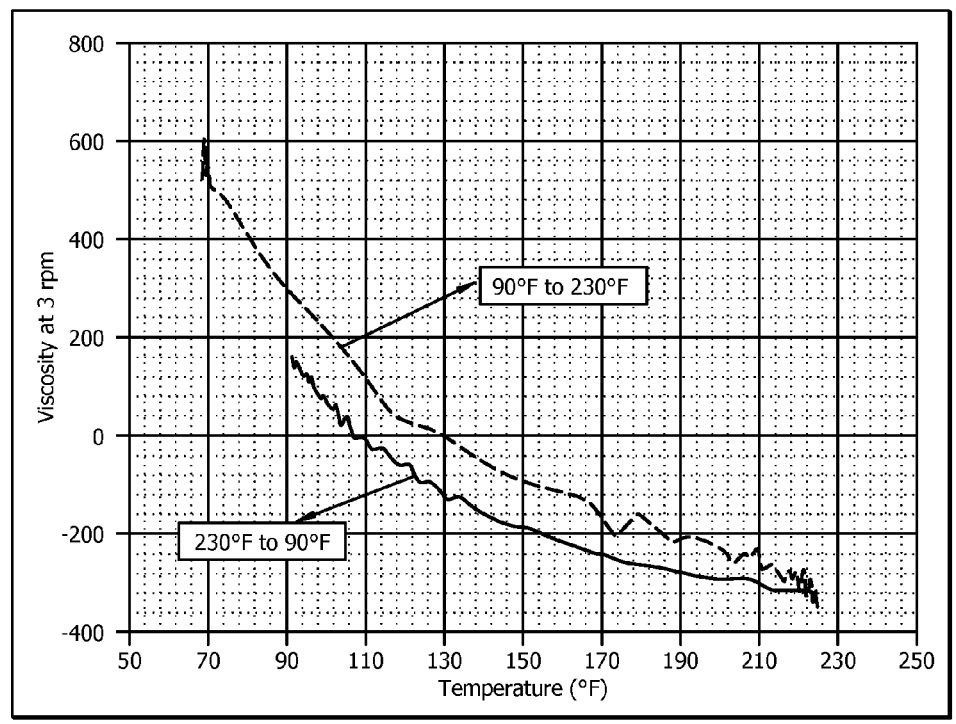
FIGS. 6-9 are plots of the rheological behavior of samples from example 2.

A plot of the viscosity at 3 rpm in the temperature range from 90° F. to 230° F. and also from 230° F. to 90° F. is presented in FIG. 6. The rheology of Sample 3 was compared to the rheology of the base fluid in the absence of a viscosifier (i.e. Sample 2), the base fluid in the presence of either 1 ppb or 3 ppb BRINEDRIL-VIS (designated Samples 4 and 5 respectively), the base fluid in the presence of 1.5 ppb BROMI-VIS, designated Sample 6, and Sample 3. All samples were mixed at 68° F. Samples containing BRINEDRIL-VIS were mixed for 1.5 hours after addition of the viscosifier to the base fluid; samples containing BROMI-VIS viscosifier were mixed for 0.5 hours after addition of the viscosifier while samples containing both BRINE-DRIL VIS viscosifier and BROMI-VIS viscosifier were mixed for 1 hour after addition of the viscosifier. The samples containing a viscosifier were conditioned by rolling for 2 hours at 150° F. prior to determining the viscosity at each mixing speed, the PV and YP. The control sample was not conditioned. The results are presented in Table 4.

TABLE 4

| Sample No. | 2 | 4 | 5 | 6 | 3 |
| --- | --- | --- | --- | --- | --- |
| Test temperature | 68° F. | 68° F. | 75° F. | 68° F. | 68° F. |
| 600 rpm | 8 | 31 | 90 | 120 | 140 |
| 300 rpm | 4 | 17 | 57 | 89 | 99 |
| 200 rpm | 2.5 | 12 | 43 | 73 | 81 |
| 100 rpm | 1 | 7 | 28 | 55 | 58 |
| 6 rpm | 0 | 0 | 5 | 16 | 16 |
| 3 rpm | 0 | 0 | 3 | 11 | 11 |
| Plastic viscosity | 4 | 14 | 33 | 31 | 41 |
| Yield Point | 0 | 3 | 24 | 58 | 58 |
| Test temp 75° F. | | | | | |
| 600 rpm | — | 31 | 95 | 121 | 147 |
| 300 rpm | — | 18 | 60 | 90 | 104 |
| 200 rpm | — | 13 | 46 | 76 | 85 |
| 100 rpm | — | 7 | 30 | 57 | 62 |
| 6 rpm | — | 1 | 6 | 17 | 16 |
| 3 rpm | — | 0 | 4 | 12 | 11 |
| Plastic viscosity | — | 13 | 35 | 31 | 43 |
| Yield Point | — | 5 | 25 | 59 | 61 |
| Test temp 100° F. | | | | | |
| 600 rpm | — | 24 | 77 | 103 | 122 |
| 300 rpm | — | 14 | 49 | 76 | 88 |
| 200 rpm | — | 10 | 37 | 64 | 72 |
| 100 rpm | — | 6 | 25 | 47 | 52 |
| 6 rpm | — | 1 | 4 | 12 | 13 |
| 3 rpm | — | 0 | 3 | 8 | 9 |
| Plastic viscosity | — | 10 | 28 | 27 | 34 |
| Yield Point | — | 4 | 21 | 49 | 54 |
| Test temp 150° F. | | | | | |
| 600 rpm | — | — | 53 | — | 89 |
| 300 rpm | — | — | 35 | — | 64 |
| 200 rpm | — | — | 27 | — | 52 |
| 100 rpm | — | — | 18 | — | 36 |
| 6 rpm | — | — | 3 | — | 7 |
| 3 rpm | — | — | 1 | — | 4 |
| Plastic Viscosity | — | — | 18 | — | 25 |
| Yield Point | — | — | 17 | — | 39 |

Figure 7:
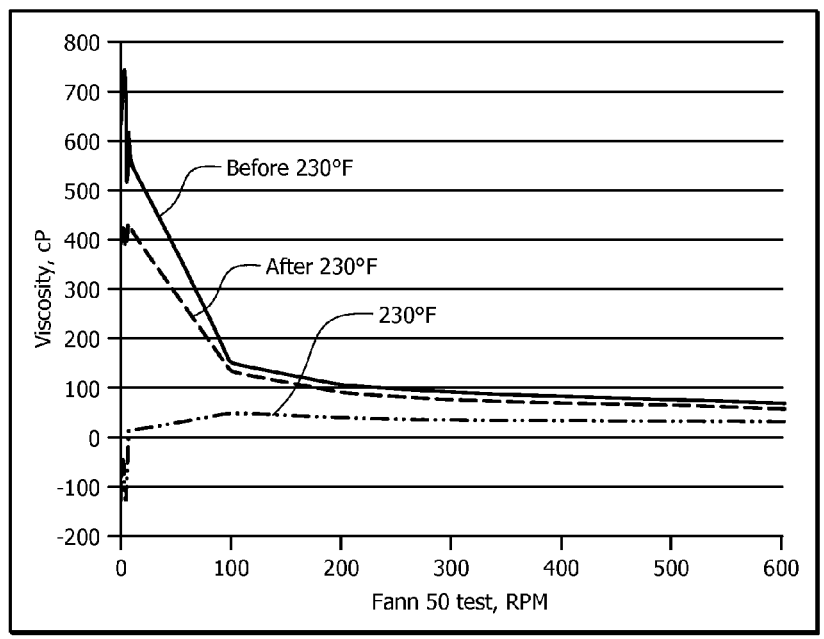
Figure 8:
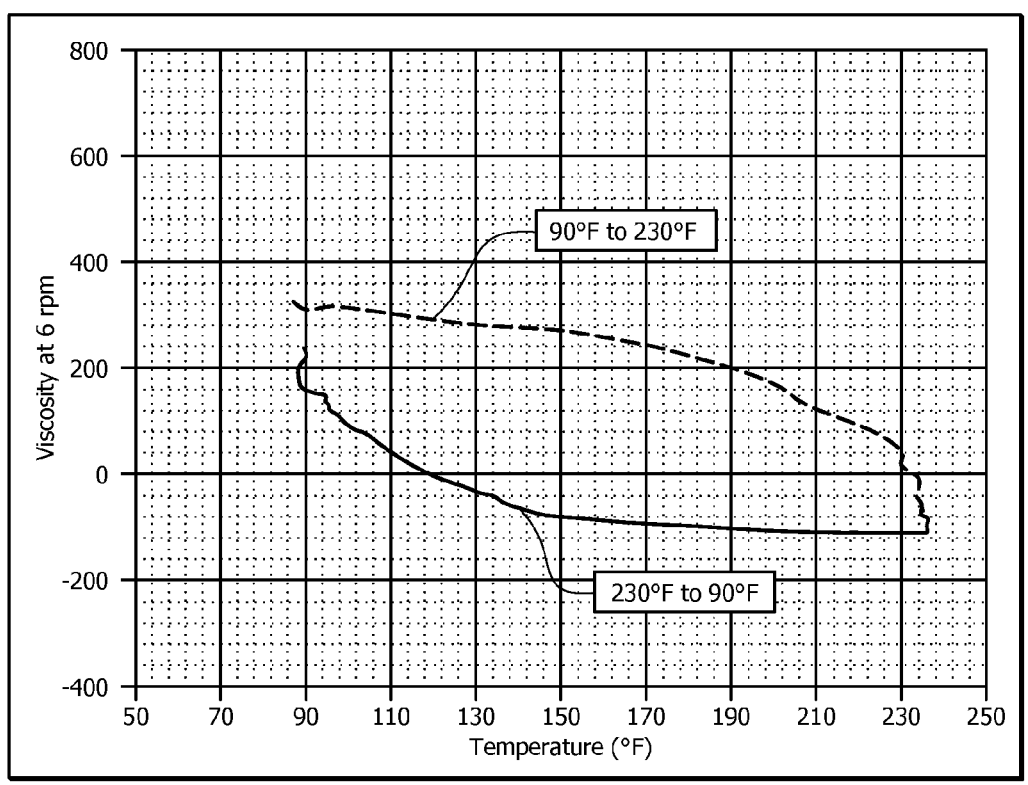
Figure 9:
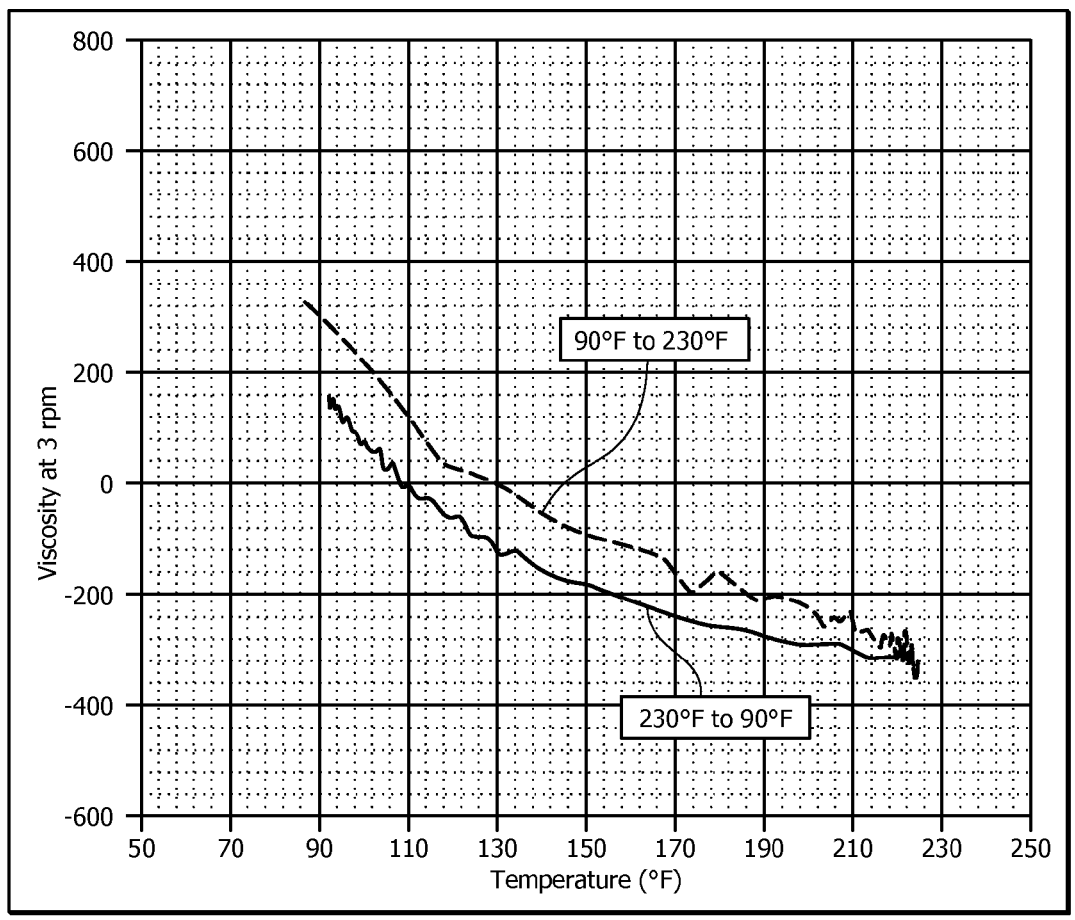

Fann rheology sweeps were conducted on Sample 3. Six hundred to three rpm sweeps were conducted at 90° F. both before and after the 230° F. and the results are plotted in FIG. 7. The results demonstrate that the polymers (i.e., BRINEDRIL-VIS viscosifier and BROMI-VIS viscosifier) displayed some thermal degradation as indicated by the difference in the before and after 230° F. runs. In addition the 3 rpm viscosity at 230° F. is negative. Additional Fann 50 test runs were conducted to examine the negative viscosity values seen at low rpms. In these runs the rpm setting was held at 6 rpm while the temperature was ramped up to 230° F. and then immediately ramped back down to 90° F. A fresh Sample 3 was then held at 3 rpm while the temperature was ramped up to 230° F. followed by ramping back down to 90° F. The results of this experiment are plotted in FIGS. 8 and 9. Referring to FIG. 8, the results demonstrate that the viscosity at 6 rpm stays positive until the sample reaches just over 230° F. The viscosity drops to approximately −95 cP and stays below zero until the brine temperature falls to approximately 120° F. At 90 V the brine is approaching the initial 90° F. viscosity. Referring to FIG. 9, the results demonstrate the viscosity at 3 rpm goes negative at 130° F. The viscosity drops to approximately 330 cP at 225° F. as the temperature is taken back down. At 110° F. the viscosity returns to a positive value. At 90° F. the viscosity is about 100 cP below the initial viscosity.

The thermal conductivity of water and Samples 1-6 were determined as indicated in Table 5. Readings 1, 2, 3, and 4 were taken at 15, 30, 45 and 60 minutes respectively.

TABLE 5

| | Temperature (° F.) | Conductivity BTU/(hr · ft · F.) |
|---|---|---|
| | Water | |
| Reading # | | |
| 1 | 65.7 | 0.336 |
| 2 | 65.1 | 0.338 |
| 3 | 64.8 | 0.343 |
| 4 | 64.6 | 0.347 |
| | Sample 1 | |
| Reading No. | | |
| 1 | 66.6 | 0.246 |
| 2 | 66.2 | 0.25 |
| 3 | 65.8 | 0.251 |
| 4 | 65.7 | 0.25 |
| | Sample 2 | |
| Reading No. | | |
| 1 | 62.8 | 0.226 |
| 2 | 62.8 | 0.25 |
| 3 | 65.8 | 0.251 |
| 4 | 65.7 | 0.25 |
| | Sample 3 | |
| Reading No. | | |
| 1 | 66.7 | 0.236 |
| 2 | 66.7 | 0.234 |
| 3 | 66.6 | .234 |
| 4 | 66.2 | 0.233 |
| | Sample 4 | |
| Reading No. | | |
| 1 | 67.3 | 0.235 |
| 2 | 66.7 | 0.235 |
| 3 | 66.4 | 0.235 |
| 4 | 66 | 0.235 |
| | Sample 5 | |
| Reading No. | | |
| 1 | 66.0 | 0.237 |
| 2 | 66.2 | 0.237 |
| 3 | 65.8 | 0.237 |
| 4 | 65.7 | 0.237 |
| | Sample 6 | |
| Reading No. | | |
| 1 | 70.7 | 0.233 |
| 2 | 69.8 | 0.233 |
| 3 | 68.9 | 0.233 |
| 4 | 68 | 0.232 |

The heat capacity of Samples 2 and 3 were determined and the results are presented in Table 6.

TABLE 6

| Test No. | Heat Capacity BTU/(lb · ° F.) |
|---|---|
| | Sample 2 |
| 1 | 0.433 |
| 2 | 0.433 |
| 3 | 0.4361 |
| | Sample 3 |
| 1 | 0.5055 |
| 2 | 0.4272 |
| 3 | 0.364 |
| 4 | 0.2116 |

The exemplary DST and/or completion method 1000 disclosed herein may directly or indirectly affect one or more components or pieces of equipment associated with the preparation, delivery, recapture, recycling, reuse, and/or disposal of the disclosed DST and/or completion method 1000. For example, the disclosed DST and/or completion method 1000 may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary DST and/or completion method 1000. The disclosed DST and/or completion method 1000 may also directly or indirectly affect any transport or delivery equipment used to convey the DST and/or completion method 1000 to a well site or downhole such as, for example, any transport vessels, conduits, pipelines, trucks, tubulars, and/or pipes used to fluidically move the DST and/or completion method 1000 from one location to another, any pumps, compressors, or motors (e.g., topside or downhole) used to drive the DST and/or completion method 1000 into motion, any valves or related joints used to regulate the pressure or flow rate of the DST and/or completion method 1000, and any sensors (i.e., pressure and temperature), gauges, and/or combinations thereof, and the like. The disclosed DST and/or completion method 1000 may also directly or indirectly affect the various downhole equipment and tools that may come into contact with the chemicals/fluids such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The following are additional enumerated embodiments of the concepts disclosed herein.

A first embodiment which is a method of servicing a wellbore within a subterranean formation comprising providing a drill string disposed within the wellbore having one or more tubulars associated therewith and forming one or more annuli around the drill string; placing an insulating packer fluid comprising an aqueous base fluid and a viscosifying agent into at least one of the one or more annuli surrounding the drill string; and performing a drill stem test while the insulating packer fluid is in place.

A second embodiment which is the method of the first embodiment wherein the wellbore is an off-shore wellbore.

A third embodiment which is the method of any of the first through second embodiments wherein the one or more tubulars comprise a marine riser and an annulus is formed between the marine riser and the drill string.

A fourth embodiment which is the method of the third embodiment wherein the marine riser annulus is filled with the insulating packer fluid.

A fifth embodiment which is the method of any of the first through fourth embodiments wherein performing the drill stem test comprises flowing produced hydrocarbons to a surface of the wellbore through the drill string; and evaluating one or more parameters of the produced hydrocarbons and/or wellbore.

A sixth embodiment which is the method of the fifth embodiment wherein the insulating packer fluid is recovered and recirculated through the marine riser annulus.

A seventh embodiment which is the method of any of the first through sixth embodiments wherein the aqueous-base fluid comprises a brine.

An eighth embodiment which is the method of the seventh embodiment wherein the brine comprises NaCl, KCl, NaBr, $CaCl_2$, $CaBr_2$, $ZnBr_2$, ammonium chloride ($NH_4Cl$), potassium phosphate, sodium formate, potassium formate, cesium formate, ethyl formate, methyl formate, methyl chloro formate, triethyl orthoformate, trimethyl orthoformate, derivatives thereof, or combinations thereof.

A ninth embodiment which is the method of any of the seventh and eighth embodiments wherein the brine is present in the composition in an amount of from about 2 wt. % to about 63 wt. %, based on the total weight of the insulating packer fluid.

A tenth embodiment which is the method of any of the first through ninth embodiments wherein the viscosifying agent comprises inorganic materials, synthetic hectorite, organophilic clays, amine-treated clays, water-soluble polymers, biopolymers, polyamide resins, polycarboxylic acids, soaps, or combinations thereof.

An eleventh embodiment which is the method of the tenth embodiment wherein the biopolymer comprises polysaccharides, lignosulfonates; chitins; chitosans; proteins; proteinous materials; fatty alcohols; fatty esters; fatty acid salts; derivatives thereof, or combinations thereof.

A twelfth embodiment which is the method of any of the first through eleventh embodiments wherein the viscosifying agent is present in the composition in an amount of from about 0.1 lb/bbl to about 25 lb/bbl.

A thirteenth embodiment which is the method of any of the first through twelfth embodiments wherein the insulating packer fluid has a thermal conductivity of from about 0.008 BTU/(hr·ft·F) to about 0.245 BTU/(hr·ft·F); and a density of from about 8.5 lb/gal to about 19.2 lb/gal.

A fourteenth embodiment which is the method of any of the first through thirteenth embodiments wherein the insulating packer fluid is a solids-free fluid.

A fifteenth embodiment which is the method of any of the first through fourteenth embodiments wherein an amount of gas hydrate formation is reduced by greater than about 30% when compared to the amount of gas hydrate formed in the absence of an insulating packer fluid.

A sixteenth embodiment which is the method of any of the first through fifteenth embodiments wherein the subterranean formation is located in permafrost or an artic zone.

A seventeenth embodiment which is the method of any of the first through sixteenth embodiments further comprising recovering the insulating packer fluid from the wellbore, reconditioning the insulating packer fluid, and placing at least a portion of the reconditioned insulating packer fluid back into the wellbore.

An eighteenth embodiment which is the method of any of the first through seventeenth embodiments further comprising recovering the insulating packer fluid from the wellbore and performing one or more completion operations utilizing the recovered insulating packer fluid.

A nineteenth embodiment which is a method of servicing a wellbore within a subterranean formation comprising placing an insulating packer fluid in an annular space between a tubular and a marine riser extending from a surface vessel or platform and a subsea wellhead, wherein the insulating packer fluid comprising an aqueous base fluid and a viscosifying agent and has a thermal conductivity of from about 0.008 BTU/(hr·ft·F) to about 0.245 BTU/(hr·ft·F).

A twentieth embodiment which is a method of servicing a wellbore within a subterranean formation comprising placing an insulating packer fluid in an annular space between a tubular and (i) a wellbore wall, (ii) a casing string, or (iii) both, wherein the wellbore penetrates permafrost and wherein the insulating packer fluid is circulated in the annular space while a drill stem test is performed.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore within a subterranean formation comprising:
    providing a drill string disposed within the wellbore having one or more tubulars associated therewith and forming an annular space around the drill string;
    circulating an insulating packer fluid comprising an aqueous base fluid and a viscosifying agent through the annular space; and
    performing a drill stem test while the insulating packer fluid is in the annular space,
    wherein performing the drill stem test comprises:
    flowing produced hydrocarbons to a surface of the wellbore through the drill string; and
    evaluating one or more parameters of the produced hydrocarbons and/or wellbore.

2. The method of claim 1 wherein the wellbore is an offshore wellbore.

3. The method of claim 2 wherein the one or more tubulars comprise a marine riser, and
a marine riser annulus is formed between the marine riser and the drill string.

4. The method of claim 3 wherein the insulating packer fluid is circulated through the marine riser annulus.

5. The method of claim 3 wherein the insulating packer fluid is recovered and recirculated through the marine riser annulus.

6. The method of claim 1 wherein the aqueous-base fluid comprises a brine.

7. The method of claim 6 wherein the brine comprises NaCl, KCl, NaBr, $CaCl_2$, $CaBr_2$, $ZnBr_2$, ammonium chloride ($NH_4Cl$), potassium phosphate, sodium formate, potassium formate, cesium formate, ethyl formate, methyl formate, methyl chloro formate, triethyl orthoformate, trimethyl orthoformate, or combinations thereof.

8. The method of claim 6 wherein the brine is present in the insulating packer fluid in an amount of from about 2 wt. % to about 63 wt. %, based on the total weight of the insulating packer fluid.

9. The method of claim 1 wherein the viscosifying agent comprises inorganic materials, synthetic hectorite, organophilic clays, amine-treated clays, water-soluble polymers, biopolymers, polyamide resins, polycarboxylic acids, soaps, or combinations thereof.

10. The method of claim 9 wherein the biopolymer comprises polysaccharides; lignosulfonates; chitins; chitosans; proteins; proteinous materials; fatty alcohols; fatty esters; fatty acid salts; or combinations thereof.

11. The method of claim 1 wherein the viscosifying agent is present in the composition in an amount of from about 0.1 lb/bbl to about 25 lb/bbl.

12. The method of claim 1 wherein the insulating packer fluid has a thermal conductivity of from about 0.008 BTU/(hr·ft·F) to about 0.245 BTU/(h·ft·F); and a density of from about 8.5 lb/gal to about 19.2 lb/gal.

13. The method of claim 1 wherein the insulating packer fluid is a solids-free fluid.

14. The method of claim 1 wherein an amount of gas hydrate formation is reduced by greater than about 30% when compared to the amount of gas hydrate formed in the absence of the insulating packer fluid.

15. The method of claim 1 wherein the subterranean formation is located in permafrost or an artic zone.

16. The method of claim 1 further comprising
recovering the insulating packer fluid from the wellbore,
reconditioning the insulating packer fluid, and
placing at least a portion of the reconditioned insulating packer fluid back into the wellbore.

17. The method of claim 1 further comprising
recovering the insulating packer fluid from the wellbore and
performing one or more completion operations utilizing the recovered insulating packer fluid.

18. A method of servicing a wellbore within a subterranean formation comprising placing an insulating packer fluid comprising an aqueous base fluid and a viscosifying agent in an annular space between a drill string and (i) a wellbore wall, (ii) a casing string, or (iii) both, wherein the wellbore penetrates permafrost and wherein the insulating packer fluid is circulated in the annular space while a drill stem test is performed,
wherein performing the drill stem test comprises:
flowing produced hydrocarbons to a surface of the wellbore through the drill string; and
evaluating one or more parameters of the produced hydrocarbons and/or wellbore.

19. A method of servicing a wellbore within a subterranean formation comprising:
providing a drill string disposed within the wellbore having one or more tubulars associated therewith and forming an annular space around the drill string;
circulating an insulating packer fluid comprising an aqueous base fluid, a hydrate inhibitor, and a viscosifying agent through the annular space; and
performing a drill stem test while the insulating packer fluid is in the annular space,
wherein the hydrate inhibitor is selected from:
the group consisting of butanol, alcohols of $C_5$ or higher and mixtures thereof, or
the group consisting of glucose, fructose, galactose, mannose, maltose, sucrose, sorbitol, mannitol, xylitol, and mixtures thereof,
wherein performing the drill stem test comprises:
flowing produced hydrocarbons to a surface of the wellbore through the drill string; and
evaluating one or more parameters of the produced hydrocarbons and/or wellbore.

* * * * *